United States Patent [19]

Mori

[11] Patent Number: 4,998,684

[45] Date of Patent: Mar. 12, 1991

[54] ACCELERATION SENSOR FOR A RETRACTABLE SEAT BELT

[75] Inventor: Shinji Mori, Niwa, Japan

[73] Assignee: Kabushiki Kaisha Tokai-Rika-Denki-Seisakusho, Aichi, Japan

[21] Appl. No.: 335,491

[22] Filed: Apr. 10, 1989

[30] Foreign Application Priority Data

Apr. 15, 1988 [JP] Japan .................................. 63-92727

[51] Int. Cl.⁵ ............................................. B60R 22/40
[52] U.S. Cl. ........................................... 242/107.40 A
[58] Field of Search ..................... 73/514, 492, 517 R; 280/806; 242/107.4 A; 180/282; 200/61.45 R

[56] References Cited

U.S. PATENT DOCUMENTS

| 3,229,060 | 1/1966 | Russakov | 73/517 R |
| 3,720,426 | 3/1973 | Johnston | 200/61.45 R |
| 3,731,020 | 5/1973 | York | 200/61.45 R |
| 4,378,475 | 3/1983 | McNeil | 200/61.45 R |
| 4,570,873 | 2/1986 | Kurtti | 242/107.4 A |

Primary Examiner—John Chapman
Attorney, Agent, or Firm—Oliff & Berridge

[57] ABSTRACT

An acceleration sensor for detecting a horizontal acceleration on the basis of a displacement of the mass bodies is arranged to have a plurality of mass bodies disposed closely to each other. A partition wall is disposed between these mass bodies so that the displacement of the mass bodies in the direction toward the partition wall can be prevented.

15 Claims, 8 Drawing Sheets

FIG. I

ACCELERATION SENSOR FOR A RETRACTABLE SEAT BELT

BACKGROUND OF THE INVENTION

1. Field of the Invention

The present invention relates to an acceleration sensor capable of being preferably employed in a webbing retractor for a seat belt adapted to sense the occurrence of an emergency on the basis of the magnitude of acceleration in the horizontal direction and thus to ensure that the occupant restraint webbing is prevented from being drawn out.

2. Related Art

Hitherto, there is known an acceleration sensor of the type described above arranged in such a manner that when a horizontal acceleration with a force exceeding a predetermined magnitude acts, a spherical mass body rises vertically along the inclined slope of a cone and pushes a movable pawl. As a result, the thus-moved pawl prevents rotation of a locking wheel of the webbing retractor so that the webbing is instantaneously prevented from being drawn out from the webbing retractor.

However, in the above-described type of acceleration sensor, the mass body thereof can resonate to the vibration of the vehicle when the vehicle runs over a rough road. As a result, as shown in FIG. 14, a ball 100 can move relative to a vertical axis 104 which passes the center line of the inclined slope 102, causing the ball 100 to be moved even though there is no emergency, and thus locking the webbing for an excessively long time.

This problem is also encountered with other types of acceleration sensors such as tipping type acceleration sensors and swing type acceleration sensors.

SUMMARY OF THE INVENTION

To this end, an object of the present invention is to provide an acceleration sensor capable of restricting resonance of a mass body due to vehicle vibration.

According to the present invention, an acceleration sensor, capable of moving a movable member due to displacement of a mass body caused when an acceleration is applied in a plurality of horizontal directions, is provided, the acceleration sensor comprises:
a plurality of mass bodies; and
a displacement restriction means for at least restricting horizontal displacement in one direction on the basis of each of the mass bodies, wherein the displacement restriction means at least restricts displacement of two mass bodies in opposite directions.

According to the present invention, since the mass bodies are restricted from at least one horizontal directional displacement by the displacement restriction means, the vibration in that direction including the opposite the initial displacement direction is restricted. Since the directions in which at least two mass bodies are restricted from moving are opposite, the movement of the movable body can be freed from the action of one directional acceleration even if the one directional displacement of the mass body is restricted.

DESCRIPTION OF THE PREFERRED EMBODIMENTS

FIGS. 1 to 4 illustrate an embodiment of an acceleration sensor according to the present invention provided for a vehicle webbing retractor.

Figure 1:
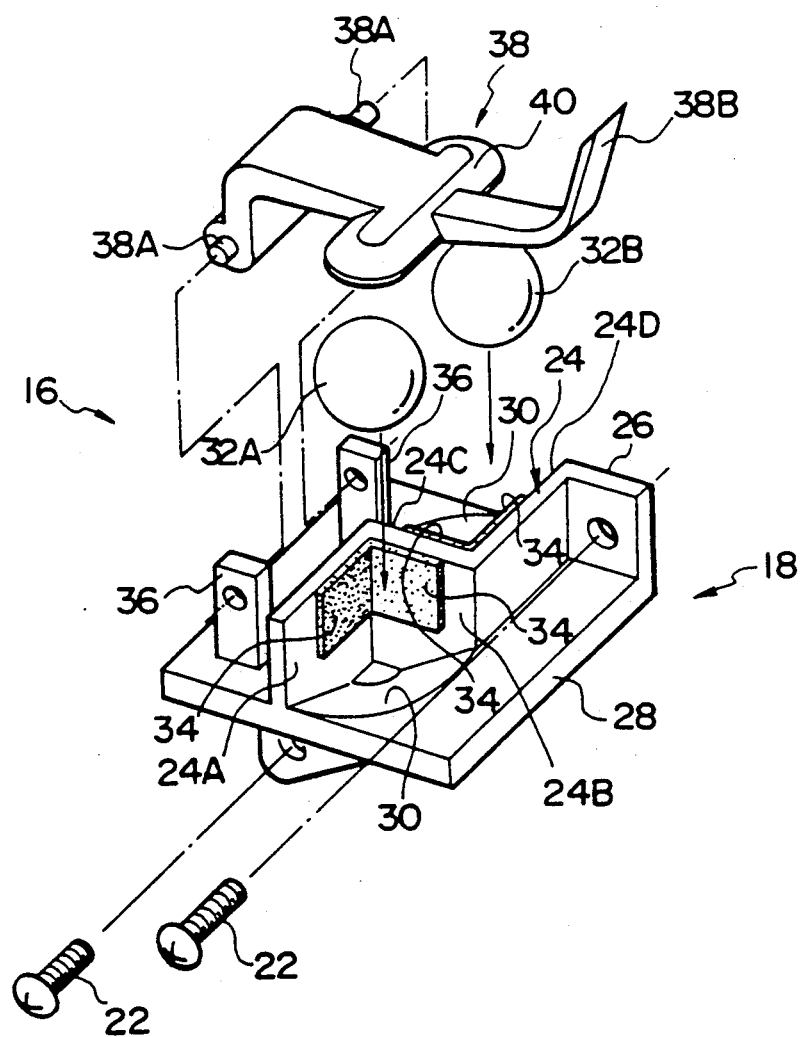
FIG. 1 is an exploded perspective view which illustrates a first embodiment of an acceleration sensor according to the present invention.
Figure 2:
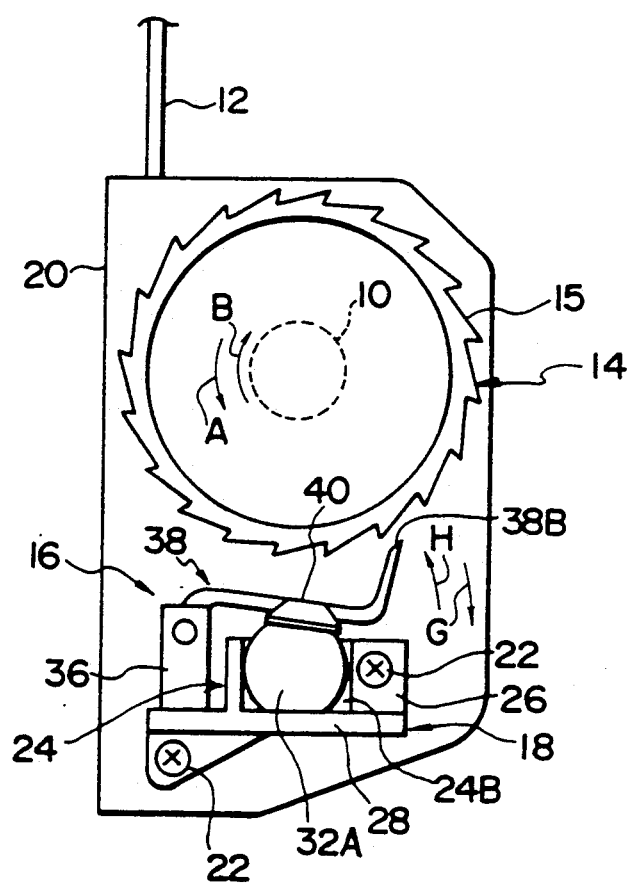
FIG. 2 is a side elevational view which illustrates the first embodiment of the acceleration sensor wherein the same is installed in a webbing retractor.

As shown in FIG. 2, the webbing retractor includes a retracting shaft 10 whose axis is arranged horizontally so that an occupant restraint webbing 12 is wound onto this retracting shaft 10 in the direction designated by an arrow A by an urging force of a coil spring (not shown). A locking wheel 14 disposed to have the same axis as that of the retracting shaft 10 is connected to this retracting shaft 10 by a locking mechanism (omitted from illustration). Ratchet teeth 15 are formed on the outer periphery of the locking wheel 14. The rotation of the retracting shaft 10 in the direction designated by an arrow B is arranged to be prevented by the above-described locking mechanism when rotation of the locking wheel 14 in the direction designated by the arrow B is prevented. As a result, the webbing can be drawn from the retractor. This retractor is provided with a acceleration sensor 16 according to the present invention and details of which will be described with reference to FIG. 1.

The acceleration sensor 16 is fastened to a frame 20 of a retractor by two screws 22 in such a manner that a bracket 18 is disposed beneath the locking wheel 14. In the bracket 18, a partition wall 24 rises vertically from the upper surface of a rectangular base portion 28 and serves as a displacement restricting means. This partition wall 24 is bent to substantially form steps. At one end of the portion wall is a fixing wall 26 that is to be secured to the frame 20 by screws 22.

A recessed portion is formed in a portion surrounded by walls 24A and 24B of partition wall 24 on the upper surface of the base portion 28. The recessed portion is formed whose bottom surface is defined by the portion in the vicinity of a joint between the walls 24A and 24B, and includes an inclined slope 30 formed by a portion of a surface of a cone. In addition, another recessed portion is formed in a portion surrounded by walls 24C and 24D of the partition wall 24 on the upper surface of the base portion 28. The another recessed portion is formed whose bottom surface is formed by the portion in the vicinity of a joint between the walls 24C and 24D, and includes an inclined slope 30 formed by a portion of a surface of a cone.

Sensor balls 32A and 32B, serving as mass bodies, are put in the inclined slope 30 of the corresponding recessed portions. The sensor balls 32A and 32B are in contact with cushion members 34 each of which is provided on the walls 24A and 24B and the walls 24C and 24D.

Figure 3:
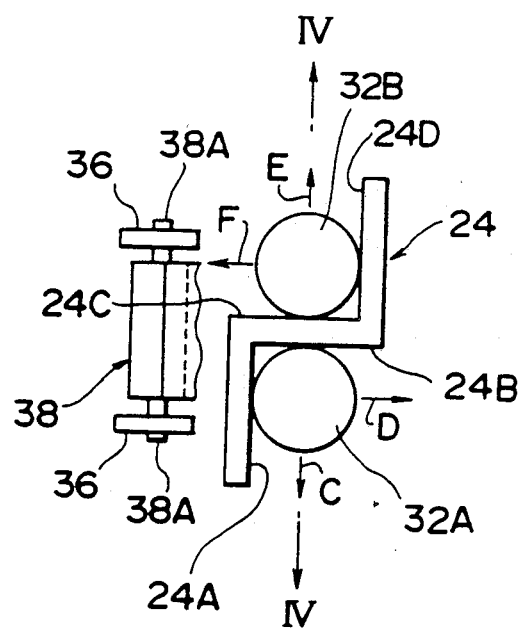
FIG. 3 is a schematic plan view of the first embodiment of the acceleration sensor according to the present invention.

As a result, sensor ball 32A can rise along the inclined slope 30 in the directions designated by arrows C and D from a state shown in FIG. 3. However, it cannot move in the opposite directions designated by arrows E and F. The other sensor ball 32B can be moved in a manner contrary to this.

The direction defined by the arrows C and E corresponds to the longitudinal direction of a vehicle, while the direction defined by the arrows D and F corresponds to the lateral direction of the vehicle. The direction defined by the arrows C and E corresponds to the axial direction of the retracting shaft 10.

An end of a pawl 38 serving as a movable member is pivoted through pins 38A, by a pair of bearings 36 arisen vertically to oppose each other on the upper surface of the base portion 28. The pins 38A are disposed in parallel to the retracting shaft 10. The pawl 38 is arranged to be moved in the direction designated by the arrowhead G (see FIG. 2) by the dead weight as a result of a structure arranged in such a manner that the intermediate portion is disposed above the partition wall 24, and a tab 38B at another end of the pawl 38 confronts the ratchet teeth of the locking wheel 14. The intermediate portion of the pawl 38 is provided with a portion 40 having a lower surface which is arranged to be brought into contact with the sensor balls 32A and 32B. The movement of the pawl 38 in the direction designated by an arrow G is prevented due to contact between the portion 40 and the sensor balls 32A and 32B. When either of the sensor balls 32A and 32B rises vertically along the inclined slope 30 from the normal state in which the two sensor balls 32A and 32B are positioned so as to be in contact with the cushion member 34, the pawl 38 is moved in the direction designated by an arrow H (see FIG. 2) so that the tab 38B engages the ratchet teeth 15 of the locking wheel 14. As a result, rotation of the locking wheel 14 in the direction designated by the arrow B is prevented.

An operation of this embodiment will be described.

When there is no horizontal acceleration, the acceleration sensor 16 is at a position shown in FIG. 2. In this state, the webbing 12 can be drawn out since the tab 38B of the pawl 38 is not engaged with the ratchet teeth 15 of the locking wheel 14.

If there is horizontal acceleration exceeding a predetermined level attributable to an emergency of the vehicle or the like, either of the sensor balls 32A and 32B rises vertically, on the basis of the direction in which the acceleration acts, along the inclined slope 30. As a result, either of the sensor balls 32A and 32B pushes the corresponding portion 40 of the pawl 38 so that the pawl 38 is moved in the direction designated by the arrow H. As a result, the tab 38B of the pawl 38 engages the ratchet teeth 15 of the locking wheel 14, and the rotation of the locking wheel 14 in the direction designated by the arrow B is prevented. Consequently, the drawing out of the webbing 12 is prevented.

When the horizontal acceleration is decreased from the state described above, the sensor ball 32A or the sensor ball 32B which has risen along the inclined slope 30 is lowered along the inclined slope 30 by the dead weight thereof. Following this movement of sensor ball 32A or sensor ball 32B, the pawl 38 is moved in the direction designated by the arrow G. As a result, the tab 38B is moved away from the ratchet teeth 15 of the locking wheel 14. Consequently, the drawing out of the webbing 12 can be conducted.

Figure 4:
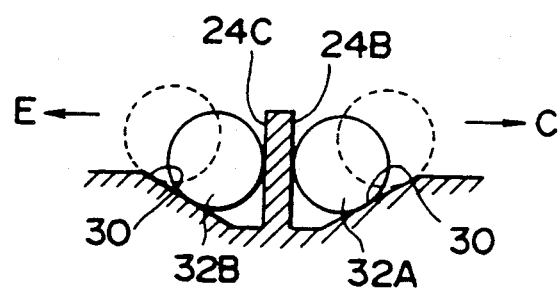
FIG. 4 is a cross-sectional view taken along line IV—IV of FIG. 3.
Figure 14:
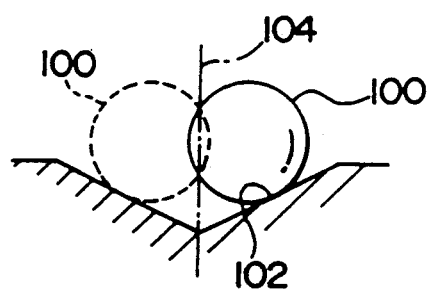
FIG. 14 is a schematic cross-sectional view which illustrates a conventional acceleration sensor.

If the vehicle is vibrated on a rough road or the like, each of the sensor balls 32A and 32B rises, as shown in FIG. 4, along the inclined slope 30, and then it is lowered along the same. However, the balls 32A and 32B cannot rise up to the opposite inclined slope 102 even if the inertia due to the lowering acts along the inclined slope 30 as in the conventional case in FIG. 14. It is then brought into contact with the partition wall 24 and its kinetic energy is damped. Consequently, the sensor ball 32 can be protected from resonance due to the vibration of a vehicle.

In particular, since the sensor balls 32 are arranged so as to collides with the cushion member 34, the effect in damping the energy can be improved and impact noise can be reduced.

As an alternative to the cushion member 34, the bracket 18 itself may be formed of a soft material.

As described above, if a continuous horizontal acceleration is applied to the sensor balls 32A and 32B in one direction when in a vehicle emergency state, the acceleration sensor, according to the present invention, acts to prevent the drawing out of the webbing 12 the same as conventional acceleration sensors even when this continuous horizontal acceleration is applied to any of the directions designated by the arrows C, D, E, and F. In addition, unlike to conventional acceleration sensors, the sensor balls 32A and 32B are protected against resonance when a vehicle runs on a rough road or the like.

Furthermore, when the vehicle is brought to a continuous inclined state, the acceleration sensor according to the present invention acts to prevent the drawing out of the webbing 12 similarly to the conventional acceleration sensors.

Figure 5:
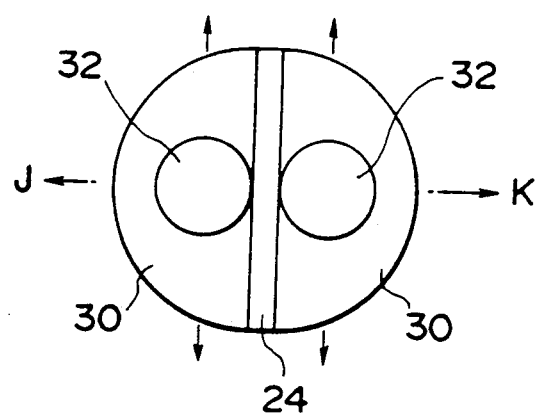
FIGS. 5 and 6 are schematic plan views which illustrate a modified example of the first embodiment.
Figure 6:
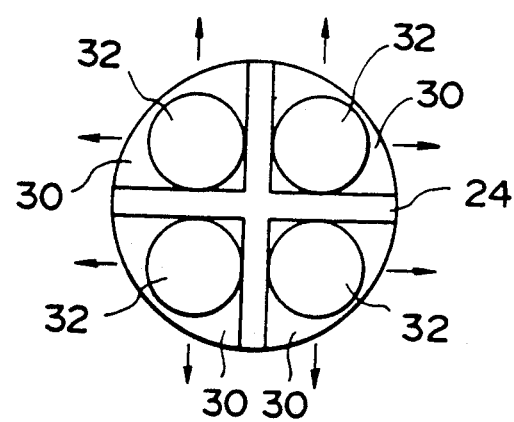

FIGS. 5 and 6 are views which illustrate a modified example of the first embodiment.

In an acceleration sensor shown in FIG. 5, the partition wall 24 is arranged so as to be able to prevent resonance of the sensor ball 32 in the directions designated by arrows J and K.

In an acceleration sensor shown in FIG. 6, although four sensor balls 32 are arranged, the basic operation is arranged similar to that of the first embodiment.

Figure 7:
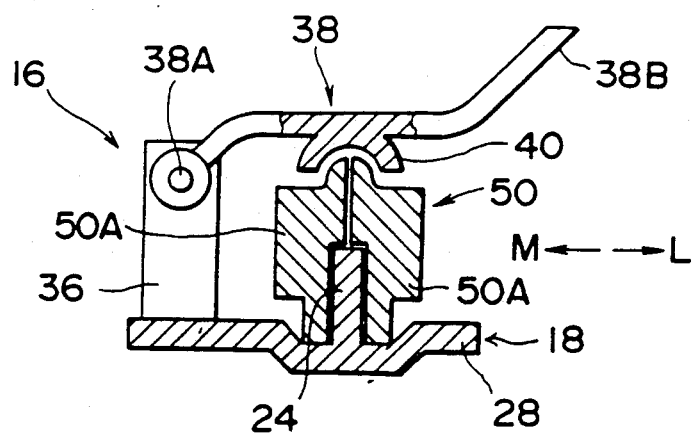
FIG. 7 is a cross-sectional view of a second embodiment of the acceleration sensor according to the present invention.
Figure 8:
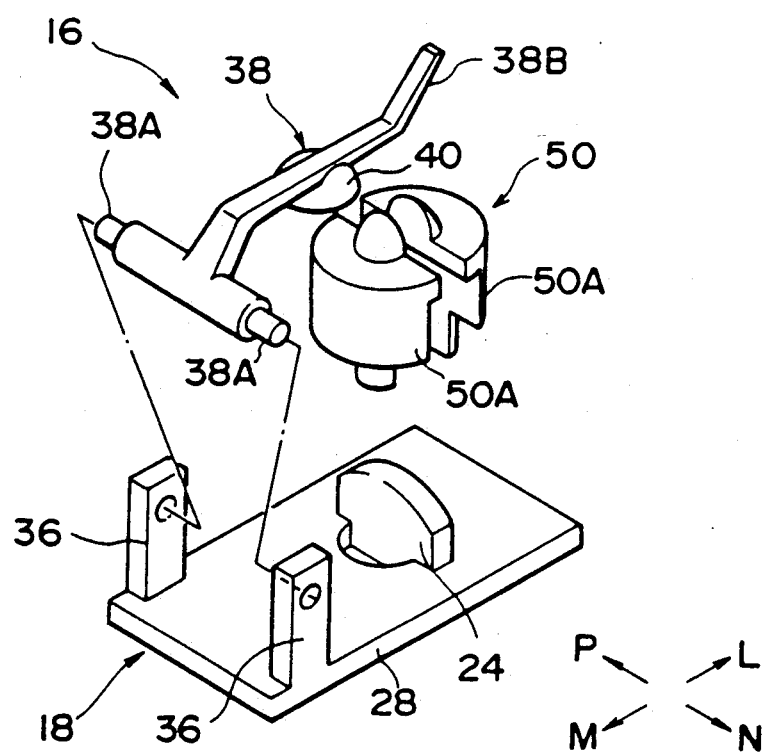
FIG. 8 is an exploded perspective view of FIG. 7.

FIGS. 7 and 8 are views which illustrate a second embodiment of the acceleration sensor according to the present invention and embodied in a tilting type acceleration sensor.

According to this embodiment, the tilting member 50 serving as a mass body is divided into two pieces which comprise a pair of members 50A. The members 50A are arranged to oppose each other in such a manner that a partition wall 24 that rises vertically from the bracket 18 is held between the lower portions of the members 50A.

Figure 9:
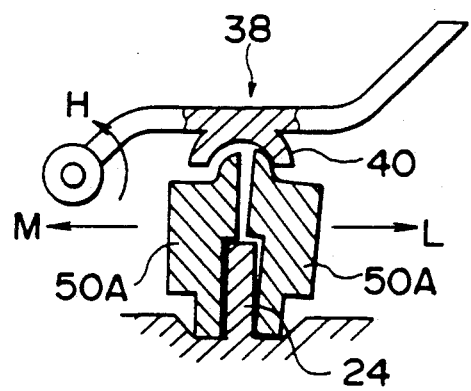
FIGS. 9 and 10 are perspective cross-sectional views which illustrate the operation of the second embodiment of the acceleration sensor according to the present invention.
Figure 10:
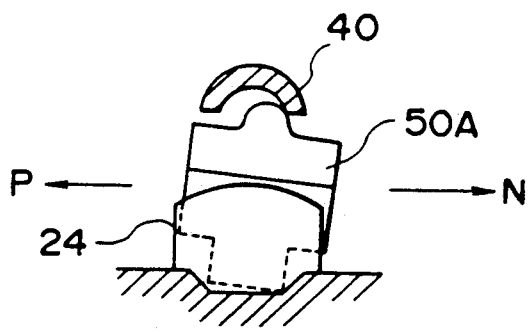

The tilting member 50 is arranged in such a manner that only one of the members 50A is arranged to tip, such as shown in FIG. 9 in the direction designated by arrow L, so as to move the pawl 38 in the direction designated by arrow H when a horizontal acceleration acts in the direction designated by arrow L or arrow M. Furthermore, if a horizontal acceleration acts in the direction designated by arrow N or an arrow P, both of the members 50A tilt, such as shown in FIG. 10 in the direction designated by arrow N, so as to move the pawl 38 in the direction designated by arrow H.

According to this embodiment, the tilting of the member 50A in the directions designated by arrow L and M is also restricted. Therefore, the tilting body is protected from resonance in the above-described directions that is attributable to vehicle vibration.

Figure 11:
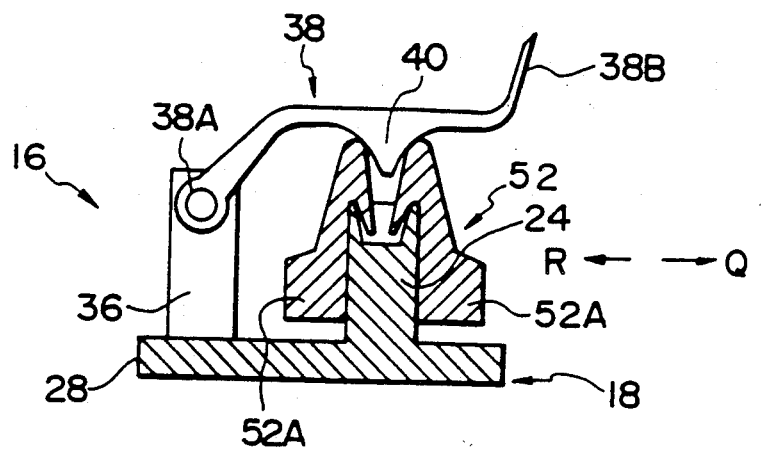
FIG. 11 is a cross-sectional view which illustrates a third embodiment of the acceleration sensor according to the present invention.
Figure 12:
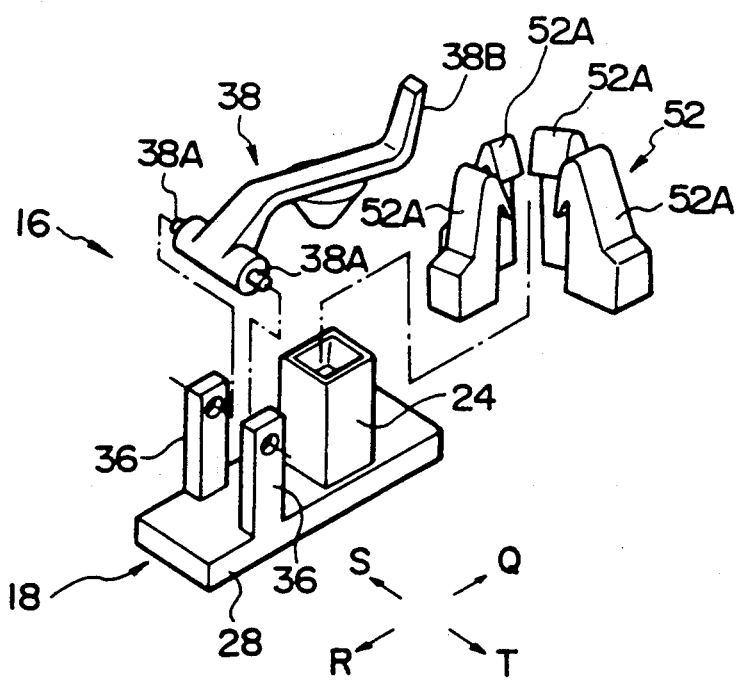
FIG. 12 is an exploded perspective view of FIG. 11.

FIGS. 11 and 12 are views which illustrate a third embodiment of the acceleration sensor according to the present invention and embodied in a swing type acceleration sensor.

According to this embodiment, a pendulum 52 serving as a mass body is divided into four pieces, these four members 52A having the same shape. Each of the four members 52A, is hung from a recessed portion in the upper portion of a partition wall 24 which rises vertically from the bracket 18 in such a manner that the four members 52A confront the corresponding side surfaces of the partition wall 24.

Figure 13:
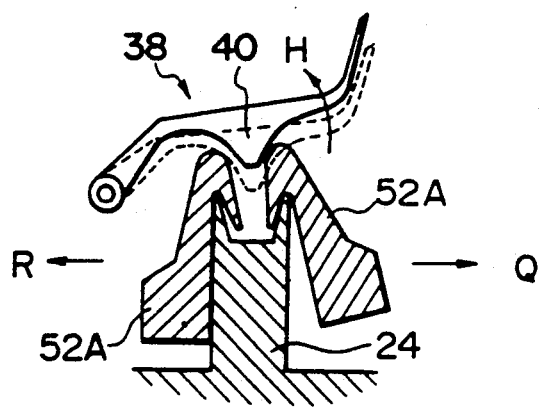
FIG. 13 is a schematic cross-sectional view of FIG. 12.

When a horizontal acceleration acts in the directions designated by arrows Q, R, S, and T, the pendulum 52 is arranged in such a manner that only one of the members 52A moves, such as shown in FIG. 13, in the direction designated by arrow Q so as to move the pawl 38 in the direction designated by arrow H, while the other three members 52A do not move.

According to this embodiment, since the moving of the member 52A is restricted in the corresponding directions designated by the arrows Q, R, S, and T, the tilting pendulum 52 is protected from resonance that is attributable to vehicle vibration.

As described above, since the acceleration sensor according to the present invention is arranged in such a manner that a plurality of the mass bodies are provided, and a displacement restriction means for at least restricting horizontal displacement in one direction on the basis of each of the mass bodies so that the displacement restriction means at least restricts displacement of two mass bodies in opposite directions, the mass bodies can be protected from resonance due to vehicle vibration.

What is claimed is:

1. An acceleration sensor for a retractable seat belt capable of moving a movable member by displacement of a mass body due to an acceleration caused when an acceleration is applied in any of a plurality of directions in a horizontal direction, said acceleration sensor comprising:
    a bracket, said bracket further comprising a base body and a partition wall disposed vertically from said base body;
    a plurality of mass bodies movably disposed on said bracket, said partition wall being between said mass bodies such that displacement of each of said mass bodies is restricted by said partition wall in at least one direction; and
    a movable member which can be moved due to the displacement of said mass bodies, wherein said movable member is in contact with said mass bodies when horizontal acceleration is less than a predetermined level and said movable member is operated by the displacement of said mass bodies when horizontal acceleration exceeds the predetermined level so as to lock the retractable seat belt and prevent withdrawal of the seat belt.

2. An acceleration sensor according to claim 1, wherein said base body further comprises a surface on which said mass bodies are disposed, said surface having a lower horizontal surface and surrounding inclined slopes such that said surface on which said mass bodies are disposed is gradually lowered in the direction toward said partition wall.

3. An acceleration sensor according to claim 2, wherein said mass bodies are positioned to be in contact with said partition wall when at rest.

4. An acceleration sensor according to claim 3, wherein the number of said mass bodies is arranged to be two, and these two mass bodies are disposed on opposite sides of said partition wall.

5. An acceleration sensor according to claim 3, wherein said partition wall is formed in a cross shape so as to divide said base body on which said mass bodies are disposed into four regions so that said mass bodies are disposed one on each of the regions.

6. An acceleration sensor according to claim 1, wherein said mass bodies are tiltable and arranged such that when horizontal acceleration acts, at least one of said mass bodies is tilted to move said movable member.

7. An acceleration sensor according to claim 1, wherein said partition wall is formed as a square column, and the number of said mass bodies corresponds to the number of sides of said partition wall, said mass bodies being pendulums suspended from said partition wall.

8. An acceleration sensor according to claim 1, wherein said partition wall has a recessed portion formed on a top surface of said partition wall and pendulums comprising said mass bodies are swingably supported at said recessed portion.

9. An acceleration sensor for a retractable seat belt comprising:
    a bracket, said bracket further comprising a base body and a partition wall disposed vertically from said base body;
    a plurality of mass bodies movably disposed on said bracket, said partition wall being between said mass bodies such that displacement of each of said mass bodies is restricted by said partition wall in at least one direction; and
    a movable member which can be moved due to movement of said mass bodies, wherein movement of said mass bodies on said bracket when horizontal acceleration is less than a predetermined level is such that movement of said movable member is not sufficient to lock the retractable seat belt and said movable member is operated so as to lock the retractable seat belt and prevent withdrawal of the seat belt by the displacement of said mass bodies when horizontal acceleration exceeds the predetermined level.

10. An acceleration sensor according to claim 9, wherein said mass bodies comprise sensor balls and said base body on which said sensor balls are disposed is divided into two regions by said partition wall, and one of said sensor balls is disposed in each of said two regions.

11. An acceleration sensor according to claim 9, wherein said mass bodies comprise sensor balls and said partition wall is formed in a cross shape so that said base body of said bracket on which said sensor balls are disposed is divided into four regions and said sensor balls are disposed one in each of the regions.

12. An acceleration sensor according to claim 9, wherein said partition wall is provided with a cushion material arranged to come into contact with each of said mass bodies.

13. An acceleration sensor according to claim 9, wherein said partition wall is formed in a flat-plate shape, and said mass bodies are tiltable and arranged to each face a different side of said partition wall.

14. An acceleration sensor according to claim 9, wherein said mass bodies comprise pendulums which are swingably hung from a recessed portion formed on the top surface of said partition wall.

15. An acceleration sensor according to claim 14, wherein said partition wall is formed as a square column, and the number of said pendulums is arranged to correspond to each side of said partition wall.

* * * * *